INVENTOR
ANTONIN SVOBODA
BY M.A.Hayes
ATTORNEY

Feb. 21, 1950          A. SVOBODA          2,498,310
MULTIPLYING LINKAGE
Filed April 1, 1946          4 Sheets-Sheet 2
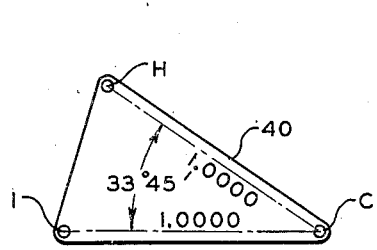
FIG. I-A
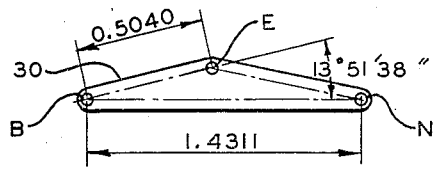
FIG. I-B
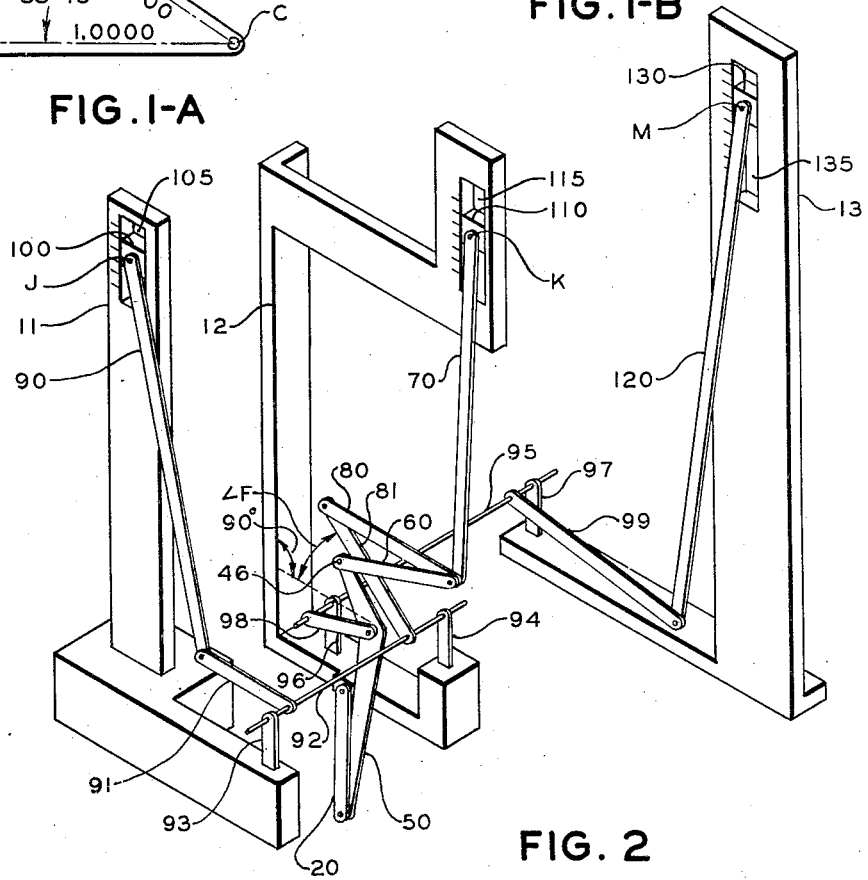
FIG. 2
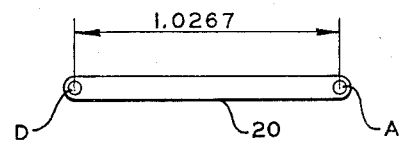
FIG. I-C
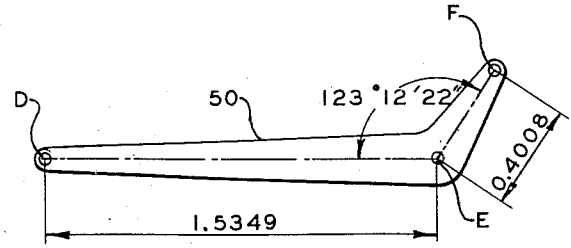
FIG. I-D
INVENTOR
ANTONIN SVOBODA
BY M. O. Hayes
ATTORNEY Feb. 21, 1950     A. SVOBODA     2,498,310
MULTIPLYING LINKAGE Filed April 1, 1946     4 Sheets-Sheet 3

INVENTOR
ANTONIN SVOBODA

BY    *M. A. Hayes*

ATTORNEY

Feb. 21, 1950      A. SVOBODA      2,498,310

MULTIPLYING LINKAGE

Filed April 1, 1946      4 Sheets-Sheet 4

INVENTOR
ANTONIN SVOBODA

BY *M. O. Hayes*

ATTORNEY

Patented Feb. 21, 1950

2,498,310

UNITED STATES PATENT OFFICE 2,498,310

MULTIPLYING LINKAGE

Antonin Svoboda, Cambridge, Mass.

Application April 1, 1946, Serial No. 658,598

2 Claims. (Cl. 235—61)

This invention relates to a mechanism for use in computing apparatus and provides a simple linkage mechanism of inexpensive construction which may be substituted for multiplication cams heretofore used in ballistic and other computing apparatus.

For general information purposes in connection with the present invention, reference is made to the textbook, Computing Mechanisms and Linkages, vol. 27, by Antonin Svoboda, Massachusetts Institute of Technology, Radiation Laboratory Series, first edition 1948, McGraw-Hill Book Company, Inc.

An object of this invention is to provide a mechanical computer for determining the product of two independent variables.

Another object of this invention is to provide a mechanical computer for determining the product of two independent variables either of which may be either positive or negative in character and which will automatically provide the proper sign to the product of the variables being multiplied.

A further object of this invention is to provide a mechanical computer having three slidable members and a linkage system for operatively connecting the members, in which the relative dimensions of the members of the linkage system are such that displacement of one of the slidable members is proportional to the product of the displacements of the remaining two slidable members.

Further objects and advantages of this invention as well as its construction, arrangement, and operation will be apparent from the following description and claims in connection with the accompanying drawings, in which:

Fig. 1a is a front view of one of the swinging members of the mechanism of Fig. 1 showing the critical dimensions of the member.

Fig. 1b is a front view of a second of the swinging members of the mechanism of Fig. 1 showing the critical dimensions thereof.

Fig. 1c is a front view of a third swinging member of the mechanism of Fig. 1 illustrating the critical dimension thereof.

Fig. 1d is a front view of a fourth member joining the members of Figs. 1c and 1b illustrating the critical dimensions thereof.

Figure 1:
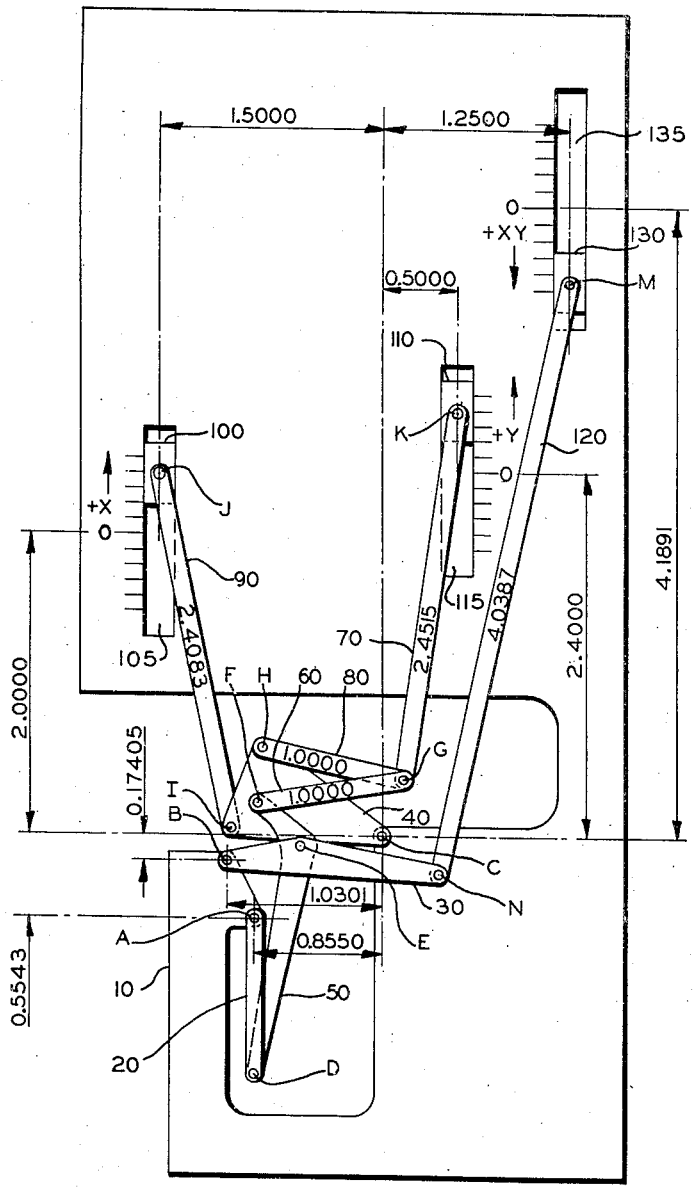
Fig. 1 is an orthographic assembly drawing of the linkage mechanism.

Fig. 2 in an isometric view of the computer in a more general form than that shown in Fig. 1.

Figure 3:
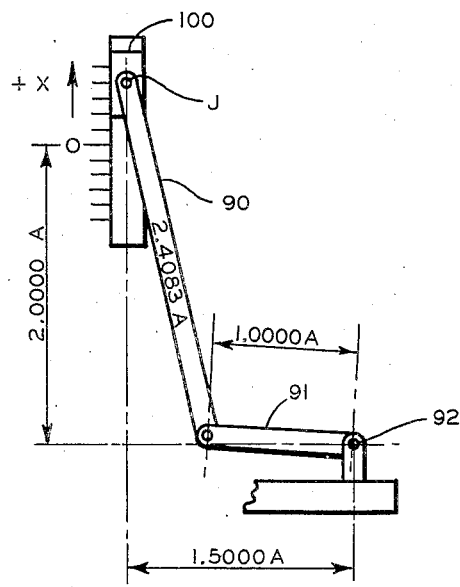

Fig. 3 is a front view of one of the input sections of Fig. 2 illustrating the critical relative dimensions thereof.

Figure 4:
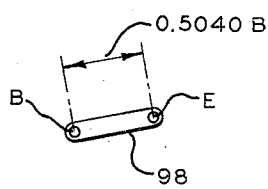
Figure 4:
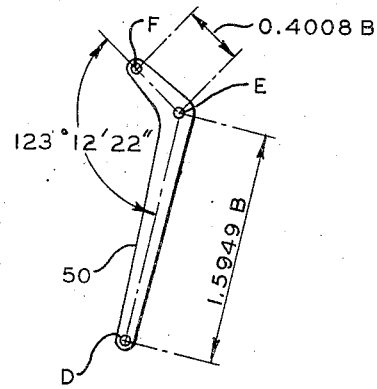
Figure 4:
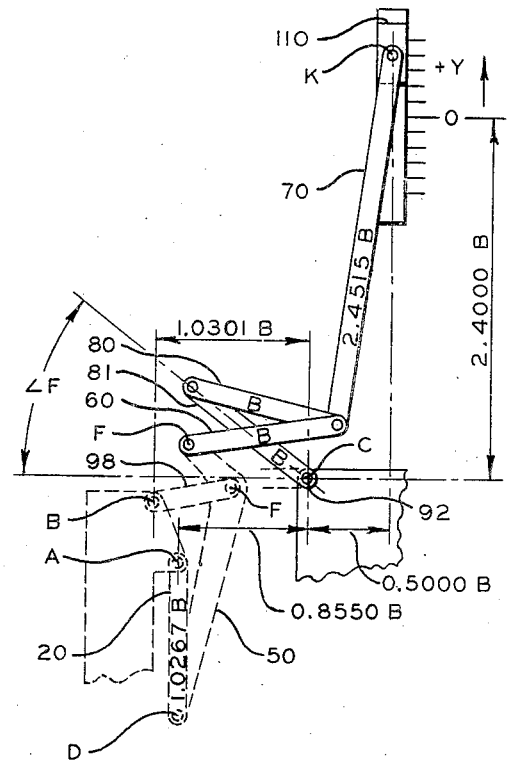

Fig. 4 is a front view of the second input section of Fig. 2 and of the guiding section associated therewith illustrating critical relative dimensions of some of the members.

Fig. 4a is a front view of one of the guide members of Fig. 4 illustrating the critical relative dimensions thereof.

Fig. 4b is a front view of guide member of Fig. 4 illustrating the critical dimension thereof.

Figure 5:
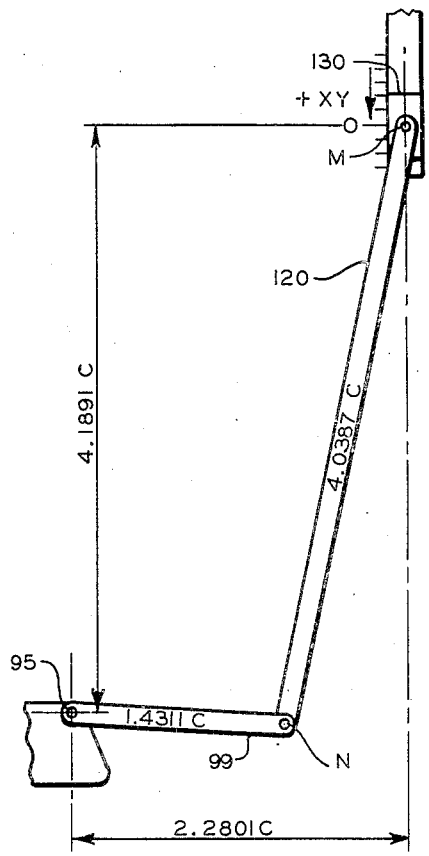

Fig. 5 is a front view of the output section of Fig. 2 illustrating the relative dimensions thereof.

Referring to Fig. 1 there is shown the general arrangement of the mechanism indicating that it includes three pivoted or swinging members 20, 30 and triangular member 40 pivoted to a fixed support or framework 10 at three pivot points A, B and C respectively. A link 50 connects the free end D of member 20 to a pin E of member 30 and to a pin F of a member 60, the latter member having the opposite end thereof connected to a pin G on one end of a member 70 which is operatively connected by means of a pin K to a slide member 110. A link 80 connects a pin H of member 40 to pin G of member 70. The final member connected to member 40 consists of a link 90 extending from a pin I of member 40 to a pin J in a slide block 100. A link 120 extends from a pin M of a slide block 130 to the free end N of member 30. Slide blocks 100, 110 and 130 are slidably mounted in slots 105, 115 and 135 respectively, and are operatively connected by the linkage heretofore recited in such a manner that motion of slide block 130 indicates the product of the settings of slide blocks 100 and 110, within the range of operation of the device. It is to be understood that all of the connections referred to are pivot connections so as to allow relative movement of the connected members, unless it is expressly indicated that the connections are rigid in character.

It is to be noticed that the locus of pin F which may be termed the "product point" is determined by the dimensions of members 20, 30, 40 and 50, together with the position of pivots A, B and C. More specifically, the effect of member 30 in determining this locus is limited to the effect of an equivalent link between pivot B and Pin E. Such a link is represented by member 98 in Figure 2, which drawing is a functional representation of the system, to be described subsequently in more detail.

In order that displacement of slide member 130 be proportional to the product of the displacements of slide members 100 and 110, the critical relative dimensions of the various members of the linkage system are as follows: where unity (1) is taken as the basis of comparison:

| | |
|---|---|
| Length of member 40 along line C—I | 1.0000 |
| Length of member 40 along line C—H | 1.0000 |
| Angle included between lines C—I and C—H | 33°45′ |
| Length of arm 20 | 1.0267 |
| Length of link 50 along line D—E | 1.5349 |
| Length of link 50 along line E—F | .4008 |
| Angle included between lines D—E and E—F of member 50 | 123°12′22″ |
| Length of member 30 along line B—E | .5040 |
| Length of member 30 along line B—N | 1.4311 |
| Angle included between line B—E and line B—N | 13°51′38″ |

Other dimensions illustrated in Fig. 1 include the following:

| | |
|---|---|
| Horizontal distance from pivot point C to pivot point A | .8550 to the left |
| Horizontal distance from pivot point C to pivot point B | 1.0301 to the left |
| Vertical distance from pivot point C to pivot point A | .5543 below |
| Vertical distance from pivot point C to pivot point B | .17405 below |
| Horizontal distance from pivot point C to line of travel slide block 100 | 1.5000 to the left |
| Horizontal distance from pivot point C to line of travel of slide block 110 | .50000 to the right |
| Horizontal distance from pivot point C to line of travel of slide block 130 | 1.2500 to the right |
| Vertical distance from pivot point C to zero point on X scale | 2.0000 above |
| Vertical distance from pivot point C to zero point on Y scale | 2.4000 above |
| Vertical distance from pivot point C to zero point on XY scale | 4.1891 above |

As it is only the relationship between the dimensions which is critical, the length of member 40 along the line C—I has, for convenience, been taken as unity so that the figures set opposite the lengths of the other parts express the relation between these lengths and the length of member 40 along the line CI which may be considered to be the base of that member.

It is to be understood that in the embodiment shown in Figure 1, that if the scales adjacent slide-blocks 100 and 110, which may be termed the X and Y inputs, have the same scale, the scale adjacent slide block 130 which may be termed the XY output, the XY output will not have this same scale, but the displacement of the XY slider will be proportional to the product of the displacements of the X and Y sliders. It is further to be understood that the dimensions and orientation of the linkage members listed above are such that the X and Y input scales are linear in nature, said scales being uniformly calibrated on either side of a zero position such that the input to the system can be any combination of positive or negative numbers. The output scale, although it necessarily must be different in units than the input scales, is nevertheless uniformly graduated to indicate both negative and positive products of X and Y.

Although the dimensions of triangle member 40 are critical as defined, this member may easily be replaced by a combination of elements comprising a link between pin I and pivot C, a link between pin H and pivot C, and means for rigidly linking these two links together so that they rotate through the same angle upon rotational motion about pivot C. In Fig. 2 such an arrangement is provided as hereafter explained.

Fig. 2 is an isometric drawing of this invention in a more general form than that shown in Fig. 1. As shown in the figure, this embodiment of the invention includes an arrangement of three frameworks 11, 12 and 13 having slide blocks 100, 110 and 130 slidably mounted, respectively, therein. A rod 92 which is rotatably mounted in a pair of supports 93 and 94 has a link 91 fixedly secured thereto in order to impart a rotational movement to the rod in response to movement of slide block 100. A link 90 having pivot connections at each end, operatively connects link 91 with a pin J of slide block 100. A link 80 connects the free end of a link 81 fixedly secured to rod 92 with the free end of a link 70 pivotally connected to slide block 110 by a pin K. A second rod 95 is rotatably mounted in a pair of suports 96 and 97, rod 95 having a pair of arms 98 and 99 fixedly secured thereto. An arm 20 which is pivotally mounted on framework 12 is operatively connected to link 60 by means of a link 50 which is pivotally connected to the free end of arm 20, the free end of link 98 and to one end of link 60, the latter link having the opposite end thereof, pivotally connected to link 70 as shown. Slide block 130 is operatively connected to arm 99 by means of a link 120 having pivot connections at each end thereof.

As heretofore stated, triangle member 40 of Fig. 1, may easily be replaced by a link between pin H and pivot C, a link between pin I and pivot C and means for causing them to rotate through the same angle. In Fig. 2 such an arrangement is indicated. The equivalent link between pin I and pivot C of Fig. 1 is represented by link 91 in Fig. 2. The link between pin H and pivot C is represented by link 81 in Fig. 2. Both links 91 and 81 are rigidly joined to rotatable shaft 92. Member 30 of Fig. 1 has similarly been represented by members 98 and 99 rigidly joined by shaft 95.

In the construction illustrated in Fig. 2, it is to be noted that if shaft 92 were temporarily severed and framework 11 were rotated about an axis through shaft 92, and then shaft 92 were again joined rigidly, the device would function exactly as it did before such rotation took place. More specifically, subject to one provision, the orientation of member 91 with respect to member 81 is of no consequence, since the only requirement is that the angular rotation of shaft 92 be proper for a given setting of slide block 100, which may be considered to be an X input. In order that this rotation may be proper (and this constitutes the provision mentioned) member 81 must be set at a properly calibrated angular position when slide block 100, which may be termed the X- input slider, is at some given position. For example, when the X- input slider is at zero setting, angle F, which is the angle between a line normal to surface 14 of framework 12 and the longitudinal axis of member 81 should be 13.74 degrees. The only function of the X- input slider and members associated with framework 11 is to position member 81 properly with respect to framework 12.

This positioning is accomplished through shaft 92, and therefore, the orientation of framework 11 with respect to framework 12 is arbitrary. It will readily be understood therefore that triangle member 40 of Fig. 1 need not now be described as having a critical interior angle at its pivot point C, provided the requirement mentioned is complied with. Furthermore, the members of framework 11 may now be described as having dimensions based upon a different reference unit than those used in the remainder of the mechanism.

The orientation of framework 13 with respect to framework 12, and the reference unit used for dimensions in framework 13 are similarly independent, provided shaft 95 is rigidly attached to members 98 and 99 when the three sliders are in a correct relative position. One such correct combination of positions would be that slider 130 which is the output slider and indicates the product of the setting of X and Y input sliders 100 and 110 respectively, is at zero when the X and Y sliders each indicate zero.

The dimensions of the X- input section are shown in Fig. 3, these relative dimensions being in terms of a dimensional unit of length A. These dimensions are as follows:

Length of link 91, pin axis to pin axis___ 1.0000A
Length of link 90, pin axis to pin axis___ 2.4083A
Vertical distance from rod 92 to zero position of X- scale_____ 2.0000A
Horizontal distance from rod 92 to axis of travel of slide block 100_____ 1.5000A The Y input section is shown by the solid lines in Fig. 4. The guiding section is shown by the dotted lines of this figure. These dimensions which are in terms of a unit B shown in Figs. 4, 4a, and 4b are as follows:

Length of link 60_____ 1.0000B
Length of link 80_____ 1.0000B
Length of link 81_____ 1.0000B
Length of arm 98_____ .5040B
Length of arm 20_____ 1.0267B
Length of member 50 along line D—E_____ 1.5949B
Length of member 50 along line E—F_____ .4008B
Angle included between lines D—E and E—F____ 123°12′22″
Horizontal distance of pivot point A from pivot point C_____ .8550B to the left
Horizontal distance of pivot point B from pivot point C_____ 1.0301B to the left
Horizontal distance of the axis of travel of slide block 110 from pivot point C_____ .50000B to the right
Vertical distance of the zero point of Y scale from pivot point C_____ 2.4000B above The output section of the device is illustrated in Fig. 5, the relative dimensions thereof being in terms of a unit C. They are as follows:

Length of member 99_____ 1.4311C
Length of member 120_____ 4.0387C
Horizontal distance of axis of travel of slide block 130 from shaft 95_____ 2.2801C to the right
Vertical distance of zero point on XY scale from axis of shaft 95_____ 4.1891C above It is to be understood that while particular values of the relative critical dimensions of the members of the linkage system have been stated, these values may vary by as much as two percent (.02) without impairing the operation of the mechanism.

To summarize the function of the various sections in the representation of Fig. 2, it may be stated that members 90 and 91 constitute what may be termed the X- input section, members 20, 50 and 98 constitute the guiding section for determining the locus of pin 46, links 60, 70, 80 and 81 constitute what may be termed the Y input section, and links 99 and 120 constitute the output section.

While two embodiments of my invention have been disclosed and described, it is to be understood that various modifications and changes may be made in this invention without departing from the spirit and scope thereof as set forth in the appended claims.

What is claimed is:

1. Apparatus for determining the product of two independent variables, each or both of which may be positive or negative, said apparatus comprising, a support, first, second and third swinging members pivotally mounted on said support in substantially coplanar relation with each other, first, second, and third slide members slidably mounted in slots in said support, said slots being calibrated with uniform scales to indicate positive and negative values at either side of a zero position, a first link operatively connecting said first slide member with said third swinging member, a second link operatively connecting said first and second swinging members, third and fourth links operatively connecting said second slide member and said second link, a fifth link operatively connecting said third swinging member and the junction point of said third and fourth links, and a sixth link operatively connecting said third slide member and said second swinging member, said links and said swinging members having the following dimensions and orientation where the basis of comparison is taken as unity (1):

Length of said first swinging member_____ 1.0267
Length of said second swinging member from the pivot point thereof to the point of connection of said sixth link thereto_____ 1.4311
Length of said second swinging member fom the pivot point thereof to the point of connection of said second link thereto_____ .5040
Angle included between lines drawn from the pivot point of said second swinging member and the points of connection of said second and sixth links thereto_____ 13°51′38″
Length of said third swinging member from the pivot point thereof to the point of connection of said first link_____ 1.000
Length of said third swinging member from the pivot point thereof to the point of connection of said fifth link_____ 1.000
Angle included between lines drawn from the pivot point of said third swinging member and the points of connection of said first and fifth links thereto_____ 33°45′
Length of said first link_____ 2.4083
Length of said second link from the point of connection of said first swinging member to the point of connection of said second swinging member thereto_____ 1.5349
Length of said second link from the point of connection of said second swinging member to the point of connection of said third link thereto_____ .4008
Angle included between lines drawn from the point of connection of said second link to said second swinging member to the points of connection of said third link and said first swinging member thereto_____ 123°12′22″
Length of said third link_____ 1.000
Length of said fourth link_____ 2.4515
Length of said fifth link_____ 1.000
Length of said sixth link_____ 4.0387
Horizontal distance of the pivot point of said first swinging member from the pivot point of said third swinging member_____ .8550 to left

| | |
|---|---|
| Horizontal distance of the pivot point of said second swinging member from the pivot point of said third swinging member | 1.0301 to left |
| Vertical distance of the pivot point of said first swinging member from the pivot point of said third swinging member | .5543 below |
| Vertical distance of the pivot point of said second swinging member from the pivot point of said third swinging member | .17405 below |
| Horizontal distance of the center line of said first slide member from the pivot point of said third swinging member | 1.500 to left |
| Vertical distance of the zero position of said first slide member from the pivot point of said third swinging member | 2.000 above |
| Horizontal distance of the center line of said second slide member from the pivot point of said third swinging member | 0.5000 to right |
| Vertical distance of the zero position of said second slide member from the pivot point of said third swinging member | 2.400 above |
| Horizontal distance of the center line of said third slide member from the pivot point of said third swinging member | 1.2500 to right |
| Vertical distance of the zero position of said second slide member from the pivot point of said third swinging member | 4.1891 above | the foregoing dimensions and orientation of members being such that the displacement of said third slide member is directly proportional to the product of the displacement of said first and second slide members.

2. A mechanical computer for determining the algebraic product of two independent variables X and Y, each or both of which may be positive or negative in sign, said computer comprising, a planar supporting member having X-, Y- and XY- slideways therein being positioned parallel to each other, X-, Y- and XY- slide members respectively slidably mounted in said slideways, said slideways each having a scale uniformly calibrated to indicate, respectively, positive and negative values of X, Y, and XY at either side of a zero position, a first triangular swinging member pivotally mounted on said supporting member, a linear swinging member pivotally attached at one end to said supporting member, a second triangular swinging member pivotally mounted on said supporting member, the aforesaid swinging members being substantially coplanar with said supporting member, a first link operatively connecting said X- slide member and a first unpivoted apex of said first triangular swinging member, a bell-crank shaped link pivotally connected at one end to the unpivoted end of said linear swinging member and pivotally connected at its knee to a first unpivoted apex of said second triangular swinging member, second and third links operatively connecting said Y- slide member and a second unpivoted apex of said first triangular swinging member, a fourth link operatively connecting the junction of said second and third links and the other end of said bell crank-shaped member, and a fifth link operatively connecting said XY- slide member and a second unpivoted apex of said second triangular swinging member, said links and said swinging members having the following dimensions and orientation where the axis of the supporting member is considered to be parallel to said slideways and the basis of comparison is taken as unity (1):

| | |
|---|---|
| Length of said first triangular swinging member from the pivot point thereof to the said first unpivoted apex thereof | 1.000 |
| Length of said first triangular swinging member from the pivot point thereof to the said second unpivoted apex thereof | 1.000 |
| Angle included between lines drawn from the pivot point of said first triangular swinging member to the said first and second unpivoted apices thereof | 33°45' |
| Length of said second triangular swinging member from the pivot point thereof to the said first unpivoted apex thereof | 0.5040 |
| Length of said second triangular swinging member from the pivot point thereof to the said second unpivoted apex thereof | 1.4311 |
| Angle included between lines drawn from the pivot point of said second triangular swinging member to the said first and second unpivoted apices thereof | 13°51'38" |
| Length of said bell-crank shaped link from the said one end to the knee thereof | 1.5349 |
| Length of said bell-crank shaped link from the said other end to the knee thereof | 0.4008 |
| Angle included between lines drawn from the knee of said bell-crank shaped member to the said ends thereof | 123°12'22" |
| Length of said linear swinging member | 1.0267 |
| Length of said first link | 2.4083 |
| Length of said second link | 2.4515 |
| Length of said third link | 1.000 |
| Length of said fourth link | 1.000 |
| Length of said fifth link | 4.0387 |
| Distance along the axis of said supporting member from the pivot point of said first triangular swinging member to the pivot point of said second triangular swinging member | .17405 below |
| Distance transversely of the axis of said supporting member from the pivot point of said first triangular swinging member to the pivot point of said second triangular swinging member | 1.0301 to left |
| Distance along the axis of said supporting member from the pivot point of said first triangular swinging member to the pivot point of said linear swinging member | .5543 below |
| Distance transversely of the axis of said supporting member from the pivot point of said first triangular swinging member to the pivot point of said linear swinging member | .8550 to left |
| Distance transversely of the axis of said supporting member from the pivot point of said first triangular swinging member to the center line of said Y- slide-member | 1.5000 to left |
| Distance along the axis of said supporting member from the pivot point of said first triangular swinging member to said zero position on said X- slideway | 2.000 above |
| Distance transversely of the axis of said supporting member from the pivot point of said first triangular swinging member to the center line of said Y- slide member | 0.5000 to right |
| Distance along the axis of said supporting member from the pivot point of said first triangular swinging member to said zero position on said Y- slide-way | 2.400 above |
| Distance transversely of the axis of said supporting member from the pivot point of said first triangular swinging member to the center line of said XY- slide member | 1.2500 to right |
| Distance along the axis of said supporting member from the pivot point of said first triangular swinging member to said zero position on said XY- slideway | 4.1891 above |
| Positive direction of said X-slideway | Above said X- zero position |
| Positive direction of said Y- slideway | Above said Y- zero position |
| Positive direction of said XY- slideway | Below said XY- zero position | the foregoing dimensions and orientation of members being such that the displacement of said XY- slide member is directly proportional to the product of the displacement of said X- and Y- slide members.

ANTONIN SVOBODA.

REFERENCES CITED

The following references are of record in the file of this patent:

UNITED STATES PATENTS

| Number | Name | Date |
|---|---|---|
| 2,229,156 | Wertheimer | Jan. 21, 1941 |
| 2,394,180 | Imm | Feb. 5, 1946 |

FOREIGN PATENTS

| Number | Country | Date |
|---|---|---|
| 113,136 | Great Britain | Feb. 7, 1918 |
| 291,556 | Italy | Dec. 19, 1931 |